United States Patent [19]

Dodgen

[11] Patent Number: 4,603,900
[45] Date of Patent: Aug. 5, 1986

[54] UPPER BED STRUCTURE FOR A RECREATIONAL VEHICLE

[75] Inventor: John N. Dodgen, Fort Dodge, Iowa

[73] Assignee: Dodgen Industries, Inc., Humboldt, Iowa

[21] Appl. No.: 691,392

[22] Filed: Jan. 14, 1985

[51] Int. Cl.$^4$ .............................................. B60P 3/38
[52] U.S. Cl. .................................. 296/156; 296/174; 296/24 R; 5/118
[58] Field of Search ............... 296/156, 164, 168, 169, 296/170, 174, 24 R; 5/118

[56] References Cited

U.S. PATENT DOCUMENTS 2,856,645 10/1958 Herrmeyer ........................ 296/169
3,722,011 3/1973 Miller ................................. 296/164
3,758,147 9/1973 Burton ............................... 296/156

FOREIGN PATENT DOCUMENTS 1912218 10/1969 Fed. Rep. of Germany ...... 296/174

Primary Examiner—Robert R. Song
Attorney, Agent, or Firm—Zarley, McKee, Thomte, Voorhees & Sease

[57] ABSTRACT

A recreational vehicle is provided with a bed structure comprised of first and second hinged panels supported by the inwardly disposed ledges extending along the side walls of the vehicle. The first panel is disposed horizontally while the second panel can be moved between a vertical position such that a storage compartment is created in the upper rearward portion of the vehicle and a horizontal position wherein a coplanar bed surface is provided in the upper rearward portion of the vehicle. Mattresses are provided for covering the bed surface and doors are provided in the second panel to provide access to the storage compartment.

1 Claim, 4 Drawing Figures

U.S. Patent  Aug. 5, 1986  4,603,900
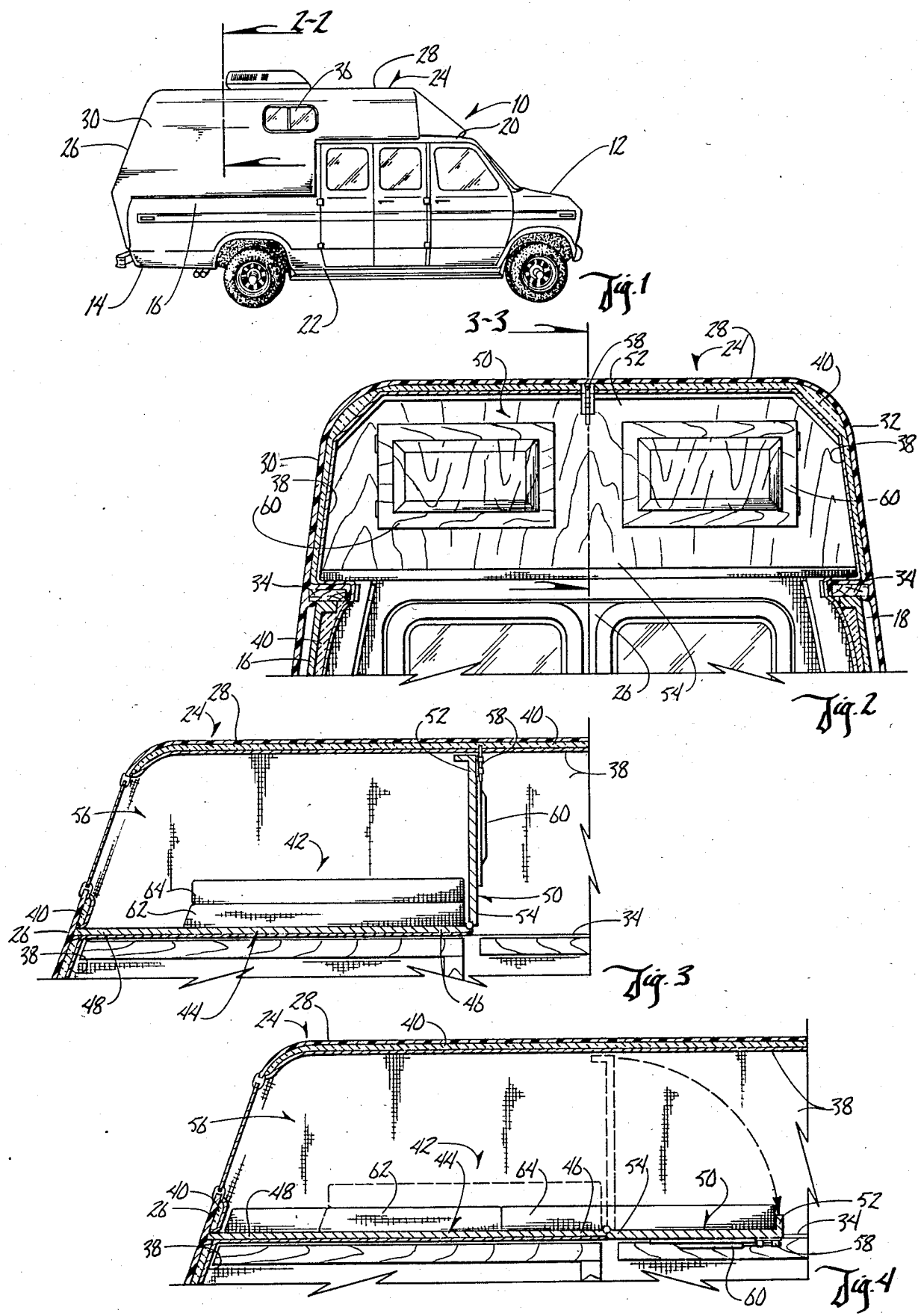

UPPER BED STRUCTURE FOR A RECREATIONAL VEHICLE

BACKGROUND OF THE INVENTION

Customized vans, commonly known as recreational vehicles, are well known and popular for comfortable traveling and for providing sleeping accomodations during trips. Typical RVs generally have a couch which can be converted into a bed. However, such RVs generally have very limited storage space.

Therefore, a primary objective of the present invention is the provision of a recreational vehicle having increased storage space and bedding accommodations.

A further objective of the present invention is the provision of a bed structure for an RV which provides both storage space and a surface for sleeping upon.

Another objective of the present invention is the provision of a bed structure for vans which provide optimum use of the space inside the van.

Still another objective of the present invention is the provision of a bed structure for RVs which can be removed therefrom.

A further objective of the present invention is the provision of a bed structure for RVs which doubles as a storage compartment and which provides easy access to the storage compartment.

Another objective of the present invention is a bed structure for vans which is economical to manufacture, and which is efficient and durable in use.

SUMMARY OF THE INVENTION

The bed structure of the present invention for use in a recreational vehicle comprises a first panel which extends between the side walls of the vehicle and which is supported by horizontal ledges extending inwardly along each side wall of the vehicle. The bed structure also includes a second panel extending between the side walls of the vehicle and being hinged to the forward edge of the first panel. The second panel can be folded upwardly from a flat horizontal position wherein it is supported by the ledges such that the first and second panels create a coplanar bed surface to a vertical position wherein the first and second panels create a storage compartment in the vehicle adjacent the roof and rearward end thereof. Mattresses are provided which can be stacked upon one another in the storage compartment and which can be moved to a side by side position to cover the panels when both panels are in a horizontal position. A latch is also provided for securing the second panel in the vertical position.

BRIEF DESCRIPTION OF THE DRAWINGS

FIG. 1 is a side elevational view of a recreational vehicle.

FIG. 2 is a view taken along lines 2—2 of FIG. 1 showing the interior of the vehicle with the bed structure of the present invention positioned therein so as to form a storage compartment.

FIG. 3 is a sectional view taken along lines 3—3 of FIG. 2 showing the storage compartment formed by the bed structure of the present invention.

FIG. 4 is a view similar to that of FIG. 3 showing the bed structure of the present invention folded into a horizontal position for sleeping purposes.

DETAILED DESCRIPTION OF THE DRAWINGS

In reference to the drawings, the numeral 10 generally designates a customized van, commonly known as a recreational vehicle, or RV. It generally includes a forward end 12, a rearward end 14, opposite side walls 16 and 18, a roof 20 and a floor 22. Van 10 has been customized by removing the majority of rearward end 14 and roof 20 and a portion of side walls 16 and 18. An upper housing or topper 24 has been positioned upon customized van 10 so as to provide an extended rearward end 26, and a raised roof 28. More particularly, topper 24 includes opposite side walls 30 and 32 and an inwardly extending flange or ledge 34 extending along each side wall for supporting the topper on the terminated side walls 16 and 18 of van 10, as best seen in FIG. 2. Topper 24 may also include windows 36 in the sides and/or rearward end thereof.

Van 10 is further customized by lining the interior of the van with cloth material or carpeting 38. Insulation 40 may also be placed between lining 38 and the side walls of the vehicle.

The above described customized van or RV 10 does not constitute a part of the present invention.

The bed structure of the present invention is generally designated by the reference numeral 42. Bed structure 42 includes a first panel 44 having a forward end 46 and a rearward end 48 and a second panel 50 having a forward end 52 and a rearward end 54. Rearward end 54 of second panel 50 is hinged to forward end 46 of first panel 44.

First panel 44 extends between the lined side walls 30 and 32 of topper 24, and is disposed in a horizontal position so as to be supported at its opposite sides by ledges 34, thus creating a horizontal deck adjacent the rearward end of RV 10. Second panel 50 also extends between the lined side walls 30 and 32 of topper 24 and can be moved between a first vertical position as shown in FIG. 3 and a second horizontal position as shown in FIG. 4.

A storage compartment 56 adjacent the upper rearward end of RV 10 is defined by first panel 44 and second panel 50 when the latter is in its vertical position. A latch 58 is provided to secure second panel 50 in the vertical position. Second panel 50 may also include doors 60 to provide access to storage compartment 56.

When second panel 50 is folded downwardly into the horizontal position, as seen in FIG. 4, it is supported at its opposite sides by ledges 34 so as to provide an auxiliary deck adjacent first panel 44. Thus, first panel 44 and second panel 50 define a coplanar bed surface when the latter is in its horizontal position.

A pair of mattresses 62 and 64 extend between lined side walls 30 and 32 of topper 24 and fit in covering relation over first panel 44 and second panel 50 when both panels are in the horizontal position. Mattresses 62 and 64 can also be stacked one upon the other within storage compartment 56, as seen in FIG. 3.

Thus, first panel 44 and second panel 50 of bed structure 42 can be arranged to provide both a storage compartment and a bed surface within RV 10. Also, bed structure 42 can be removed from RV 10 if so desired. Therefore, at least all of the stated objectives are satisfied.

What is claimed is:

1. In combination with a van vehicle having an interior compartment, a rearward end and a forward end, and an upper portion,
   a storage compartment in the upper portion of said van adjacent its rearward end comprising a horizontal deck having forward and rearward ends and opposite side edge portions, and a panel structure hinged to the forward end of said deck and having opposite side edge portions,
   means on said panel structure for releasably rigidly securing said panel structure in a vertical position,
   horizontal ledge means extending substantially continuously along each side of said interior compartment at the level of said horizontal deck for supporting said horizontal deck along the side edge portions thereof, such that the area beneath the horizontal deck is substantially free from obstructions, and whereupon said panel structure can be pivoted to a horizontal position with its side edge portions resting on said ledge means to provide an auxiliary deck portion coplanar with said horizontal deck,
   door means on said panel structure for providing access to said storage compartment when said panel structure is secured in said vertical position, said door means having a supporting surface less than that of said panel structure, and being located inwardly away from the perimeter of said panel structure, and
   mattress means in said storage compartment to substantially cover said horizontal deck and said auxiliary deck to create a bed means thereon, said mattress means including a single mattress component that covers said door means and said panel structure.

* * * * *